United States Patent

Keating et al.

[11] Patent Number: 5,973,478
[45] Date of Patent: Oct. 26, 1999

[54] BATTERY RECHARGER USING TAPER CHARGE

[75] Inventors: Joseph Keating, Denver, Colo.; Brent D. Schroeder, Belgrade, Mich.

[73] Assignee: Bolder Technologies Corporation, Golden, Colo.

[21] Appl. No.: 08/862,539

[22] Filed: May 23, 1997

[51] Int. Cl.$^6$ ............................ H01M 10/44
[52] U.S. Cl. ............................ 320/125
[58] Field of Search ................ 320/125, 128, 320/136, 148, 156, 160, 161, 163, FOR 121, FOR 122, FOR 138

[56] References Cited

U.S. PATENT DOCUMENTS

| | | | |
|---|---|---|---|
| 4,146,830 | 3/1979 | Foster | 320/160 |
| 5,166,596 | 11/1992 | Goedken | 320/160 X |
| 5,175,485 | 12/1992 | Joo | 320/160 |
| 5,432,426 | 7/1995 | Yoshida | 320/160 |
| 5,500,584 | 3/1996 | Shimomoto | 320/160 X |
| 5,616,007 | 4/1997 | Keidl et al. | 320/160 X |

Primary Examiner—Edward H. Tso
Attorney, Agent, or Firm—Gibson, Dunn & Crutcher LLP

[57] ABSTRACT

An electrochemical cell is recharged in series with a constant voltage source and a resistor, wherein the charging current declines as a function of increasing cell voltage. When the change in voltage of the battery with respect to time decreases to near zero, the changing cycle is ended or converted to a maintenance charge.

9 Claims, 4 Drawing Sheets

BATTERY RECHARGER USING TAPER CHARGE

This invention relates to electrochemical cell and battery rechargers, and more specifically, to a recharger primarily to be used with lead-acid cells or batteries that uses a taper charge method, and terminates charging or converts to a maintenance charge after the detection of a near zero change in voltage with respect to time across the recharging cell.

BACKGROUND OF THE INVENTION

The use of rechargeable cells and batteries has been steadily and rapidly increasing in recent years. With developments in rechargeable cell technology, rechargeable cells are used for power not only in traditional areas such as flashlights and small electronic devices but also in heavy duty power tools, temporary power sources, small vehicles such as forklifts, and even larger vehicles such as small automobiles. Of course, rechargeable cells are also widely used in the starting systems of gasoline powered vehicles and tools. Strictly speaking, a "battery" is a set of cells in series or parallel. For purposes of the present invention, however, the terms may be used interchangeably.

A characteristic of rechargeable cells is that the internal resistance of the cells and the electrochemical reaction in the cells during recharging tends to produce heat. This heat, in turn, further increases the internal resistance, which leads to still more heat. There is thus a cycle of heat production during recharging which if left uncontrolled will damage or even explode the cell.

In some nickel-cadmium cell rechargers, excessive heat build-up is prevented by use of a heat sensitive switch such as a bimetallic switch. If the temperature of the switch exceeds a predetermined switch activation temperature, the switch is opened to reduce the recharging current from full current to a trickle charge current or to cut-off the recharging current altogether. The thermocouple switch approach is relatively imprecise, since the temperature of the switch will be affected somewhat by the proximity of the switch to the cells being recharged and even by the ambient air temperature. In the case of nickel-cadmium cells, however, these variables are not very important since nickel-cadmium cells will withstand fairly high temperatures without being damaged.

There have recently been dramatic advances in lead-acid cells, as demonstrated by the thin-plate lead-acid batteries disclosed in U.S. Pat. No. 4,047,300 by Juergens and assigned to the assignee of the present invention. Lead-acid cells are less resistant to damage from high temperatures than are nickel-cadmium cells. For example, placing a typical rechargeable lead-acid cell into the type of nickel-cadmium recharger that has a heat sensitive cutoff-switch would cause high-temperature damage to the cell even before the temperature reached a sufficient level to open the switch to convert from full current to a maintenance charge current or no current. One approach to avoid this is to use a heat sensitive switch with a lower switch-off threshold, so that the switch will open at a lower temperature before the cell is heat damaged. Such an approach is not very feasible, however, because the lower temperature would need to be so low that the switch would be affected by the temperature variables mentioned above such as the precise placement of the switch in relation to the cell and ambient air temperature. A practical cutoff circuit is described in U.S. patent application No. 08/079,056 by Keating and assigned to the assignee of the present invention, where charging is reduced from full current to a maintenance charge current after a predetermined voltage of the charging cell is exceeded.

Another approach to cell charging is to use a timer to limit the duration of recharging. The timer may be used to either abruptly terminate the charging after a certain time has elapsed, or to continuously reduce the charging current as time elapses. However, batteries may develop different charging characteristics as they are successively discharged and recharged. Therefore, a cell charger using a constant charging time will not provide optimal charging. Other rechargers look for an upper voltage threshold to terminate charging. This still does not provide optimal charging because cells will obtain different maximum voltages at different states in their life-cycles. In the field of nickel-cadmium batteries, U.S. Pat. No. 5,196,780 teaches a recharger in which the charging is discontinued when the cell voltage begins to decline on overcharging as is common for these types of cells.

SUMMARY OF INVENTION

The present invention is a cell or battery recharger, primarily for lead-acid cells. In the preferred embodiment, the charger includes a voltage power source in series with a resistor and the cell to be charged. As current is passed though the charging cell, charging occurs and the voltage of the charging cell increases. The charging current declines as the cell voltage increases. This reduction in current as the battery recharges limits the heat produced during the charging process. Charging is terminated or converted to a small maintenance charge current when the increase in cell voltage over time drops below predetermined value.

The preferred embodiment of the present invention contains processors which senses the voltage of the charged cell, convert the voltage to a digital value, store that value, and compare that value with a previously stored value. The cutoff is reached when the voltage is approximately the same for a predetermined number of successive readings. In practice, small fluctuations between readings may always be present for a variety of reasons, such as imprecisions in voltage measurement. Therefore, the control circuit treats the voltage as having reached its cutoff value when the difference between the predetermined number of successive readings is less than a selected amount. Such a process can also be accomplished using analog circuitry.

An advantage of the invention is that taper charging occurs for all batteries despite differences in the charge characteristics of the individual batteries. Charging is tailored to individual batteries, as opposed to other methods which must use an estimate for the total charge time or an estimate for the maximum voltage that the charging battery may obtain.

DETAILED DESCRIPTION OF THE PREFERRED EMBODIMENTS

Figure 1:
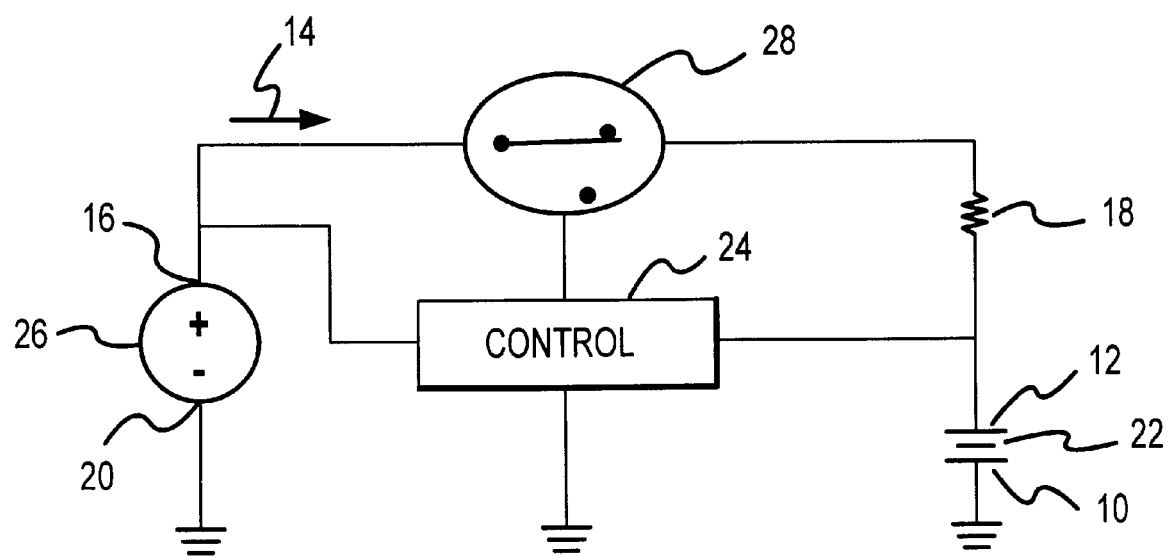
FIG. 1 is a schematic electrical diagram of the present invention and a cell to be recharged.

A schematic electrical diagram of the preferred embodiment of the present invention is shown in FIG. 1. The invention is electrically connected to the positive terminal 12 and the negative terminal 10 of a battery 22 to be recharged. The main current 14 runs from the positive terminal 16 of a power source 26 through a resistor 18 and through the cell 22 back to the negative terminal 20 of the power source 26. The control microprocessor 24 has sufficiently high impedance so that it does not affect the main current flow 14

The current that initially flows through the circuit is established according to the equation:

$$I = \frac{(V_p - V_c)}{R} \pm x$$

where:

I=current $V_p$=fixed voltage of the power supply $V_c$=voltage of the cell

R=impedance of the resistor x=a tolerance

This would result in a linear relation between current and cell voltage; the current would be at a peak initially when cell voltage is at a minimum, and would decline in a straight line function as cell voltage increased. In a preferred embodiment, the resistor impedance R is 0.3 ohms, the voltage power supply is 3.05 V, and the tolerance x is 50 mA. The equation above thus reduces to:

$$I = 3.05/0.3 - V_c/0.3 \pm 0.050$$

Alternatively, the power supply may be limited in its ability to deliver current in order to reduce the component costs. If the current limit of the power supply is less than the theoretical current draw established by the equation above, the current is constant over an initial period of time as cell voltage steadily increases, until cell voltage reaches a level where the cell begins to draw less current than the capacity of the power supply. The current then begins to decline as a function of increasing cell voltage. For purposes herein, the initial constant current is referred to as the "constant current," the cell voltage at which the current that is drawn is equal to the current capacity of the power supply is referred to as the "transition voltage," and the declining current as the cell voltage increases past the transition voltage is referred to as the "variable current." It is noted that this initial current is constant only in an alternative embodiment wherein the power supply current is limited in order to reduce component costs; the general case is that the initial current varies as a function of increasing cell voltage.

Consider the case where the current of the power supply is limited to a level between approximately 1.5 to 4.5 A. The constant current in that embodiment will therefore be at that limit until the cell voltage reaches the transition voltage. The transition voltage can be determined by assuming the constant current of the limit and solving for $V_c$, in the above equation. In the case of a 4.5 A constant current limit:

$$4.5 = 10.17 - V_c/0.3 \pm 0.050$$

$$V_c = 1.7 \text{ V}$$

In the case of a 1.5 A constant current limit:

$$1.5 = 10.17 - V_c 0.3 \pm 0.050$$

$$V_c = 2.6 \text{ V}$$

Thus, in the case of a power supply with a current capacity of 4.5 A, the charging current will be at a constant current of 4.5 A until the cell voltage reaches a transition voltage of 1.7 V, and then the charging current will change to a variable current which declines as a linear function of increasing cell voltage. In the case of a power supply with a current capacity of 1.5 A, the charging current will be a constant current of 1.5 A until the cell voltage reaches a transition voltage of 2.6 V, and then the charging current will change to a variable current which declines as a linear function of increasing cell voltage.

The variable current equals the difference between the cell voltage $V_c$ and the fixed voltage of the power source $V_p$ divided by the value of the resistor. Under the general embodiment in which the charging current is variable throughout the charging regime, and under the variable current portion of the charging regime of the alternative embodiment, the variable current continues to charge the cell, causing the cell voltage $V_c$ to increase. As the cell voltage $V_c$ increases, the difference between the cell voltage $V_c$ and the voltage of the power source $V_p$ decreases, hence the value of the variable current decreases. In other words, the variable current tapers off as the cell becomes further charged.

Figure 3:
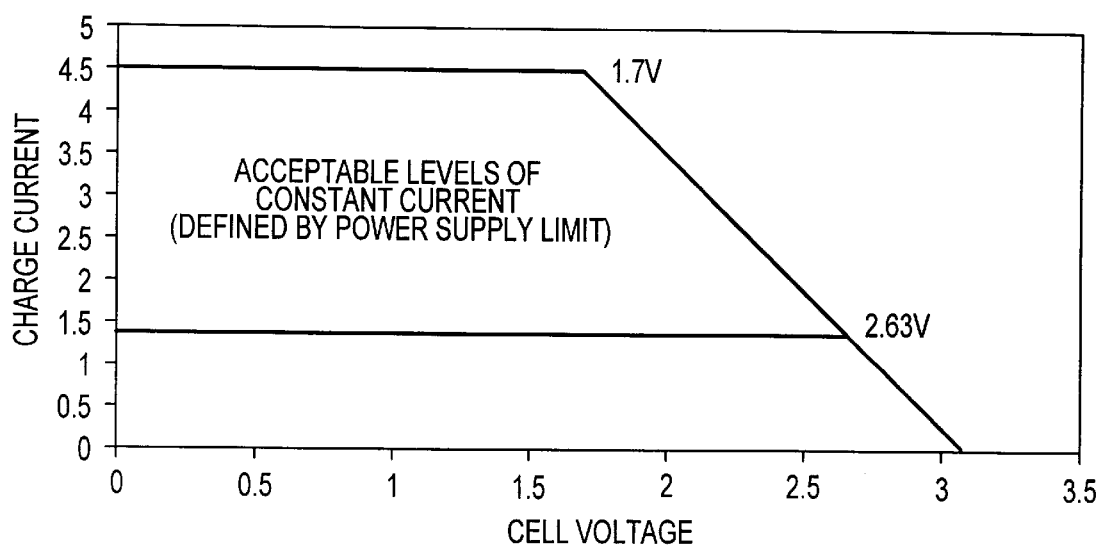
FIG. 3 is a graph of charging current as a function of cell voltage for a typical recharging cell in accordance with the present invention.

The taper charge regime of the present invention as described above is depicted in a preferred embodiment in the diagram of FIG. 3, which plots charging current against cell voltage. The diagram of FIG. 3 assumes a nominal 2 V cell, a fixed voltage power supply of 3.05 V, and a resistor impedance of 0.3 ohms. Power supply is limited to between 1.5 and 4.5 A, resulting in a transition voltage between 1.7 and 2.6 V, although it should be emphasized that limiting the power supply current is a design constraint that is not necessary to a general embodiment of the invention. The cross-hatched portion of FIG. 3 shows a possible range of initial constant current threshold and the resulting transition voltage for this embodiment. It should be apparent that voltages and resistance impedance are proportionately increased for multi-cell batteries or for cells of increased voltages.

When the cell voltage reaches the transition voltage, the taper charge portion of the charge regime commences, during which the current varies as a function of cell voltage. More specifically, the current gradually declines as the cell voltage gradually increases, in accordance with the current formula set forth above. The charge regime thus has two components in this alternate embodiment: a constant current component during which the charging current is a fixed value and independent of varying cell voltage, and a variable current portion during which the charging current tapers as a function of increasing cell voltage. In the general case, however, the charge regime has only the single component of declining current as a function of increasing cell voltage.

Figure 2:
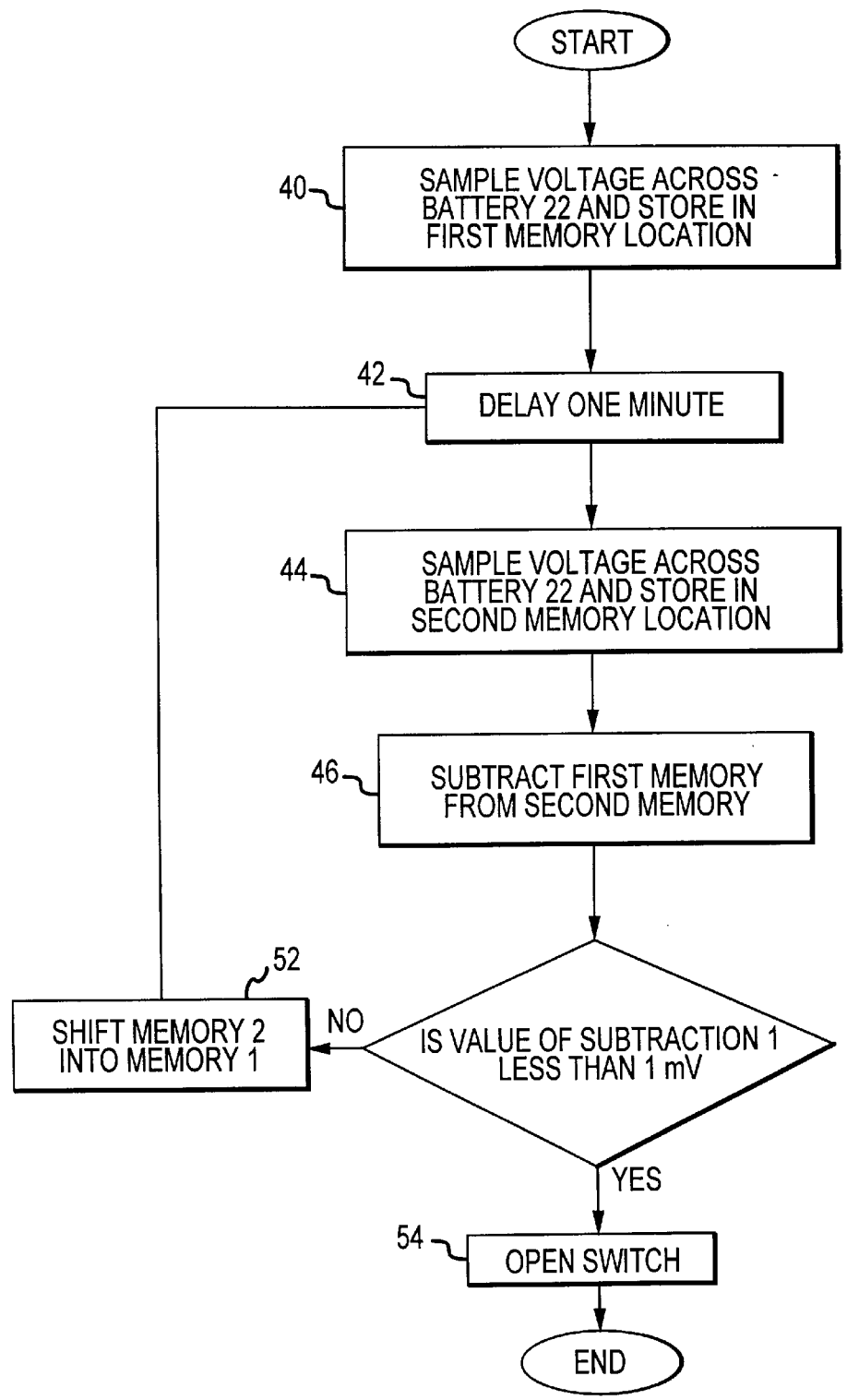
FIG. 2 is a flow chart showing a sequence of operations in a preferred embodiment of the present invention.

Next described is the protocol for terminating the charge or converting to a maintenance current charge. The present invention may be controlled by a microprocessor 24 or by equivalent analog circuitry. In the preferred embodiment, the microprocessor 24, the voltage source 26, and the resistor 18 shown schematically in FIG. 1 are assembled as one physical unit. With reference to FIG. 2, the operation of the microprocessor 24 may be understood. After the cell 22 to be recharged is connected at its positive and negative terminals 12 and 10, the microprocessor 24 uses an internal digital voltmeter to sample the voltage across the recharging cell 22 and stores this value in a first memory location, step 40. After a one minute delay (or other desired time period), step 42, the voltage across the cell 22 is again sampled and stored in a second memory location, step 44. The value of the first memory location is subtracted from the value of the second memory location, step 46. If the value of this subtraction is less than 0.5 mV (or other desired difference), the microprocessor 24 opens a switch 28 which terminates the charging of the battery 22, step 54. If the value of the subtraction in step 46 is greater than 0.5 mV (or other desired difference), the value stored in the second memory is shifted to the first memory, step 52, and the microprocessor 24 next performs step 42.

In another embodiment of the invention, opening the switch 28 changes the charging method of the cell 22 from taper charge to a maintenance charge instead of ending the charging cycle. By "maintenance charge," it is meant that the charging cell receives a very low charging current, or an intermittent charging current, or both, for the purpose of merely maintaining a charged state.

In another embodiment of the invention, the microprocessor 14 does not start the timer of step 50 until the voltage of battery 22 has not varied by more than 0.5 mV (or other desired difference) for a desired number of successive samples. This embodiment may easily be achieved by adding the desired number of memory registers to microprocessor 14.

In essence, the microprocessor 24 determines when approximately zero change in voltage with respect to time of the cell 22 occurs, and then stops the taper charging of the cell. It should be appreciated that the threshold value of the difference between successive voltages may be other than 0.5 mV and that the period between sample times may be other than one minute. The point is to determine that the voltage has leveled off, that is, that the ongoing charge rate has essentially become near zero.

Figure 4:
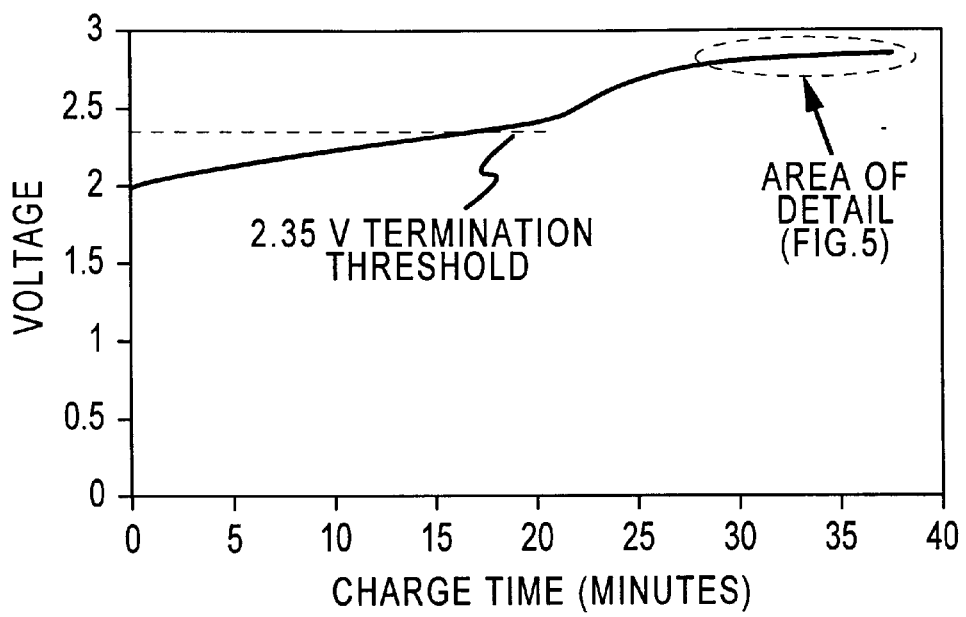
FIG. 4 is a graph of the voltage of a typical recharging cell as a function of time.
Figure 5:
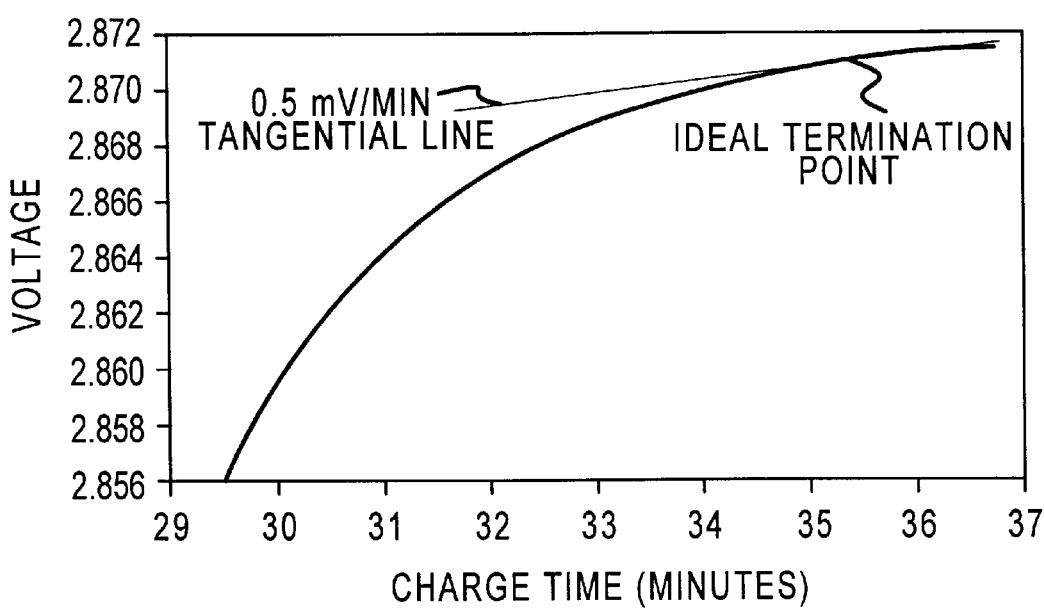
FIG. 5 is a detail of a portion of FIG. 4.

The termination of charge, or conversion to a maintenance current charge, is better understood by reference to FIGS. 4 and 5. FIG. 4 shows cell voltage as a function of charge time for a typical nominal 2 V cell of the thin plate design. It can be seen that the cell voltage, represented by the curve, steadily increases over time as charging progresses. The termination of charge, or conversion to a maintenance charge, protocol begins when the cell voltage as determined by the voltmeter exceeds a pre-established termination threshold voltage, which is 2.35 V in this example. The reason for delaying the protocol until a termination threshold voltage is reached, is to ensure that the charge is not terminated or converted to a maintenance charge prematurely due to possibly slow voltage increases in the initial recharging or ordinary variability in the deleted voltage of the cell. When the cell voltage reaches the termination threshold voltage of 2.35 V, the protocol commences.

FIG. 5 shows a detail of FIG. 4 which depicts the termination portion of the FIG. 4 curve representing cell voltage as a function of time. The curve of FIG. 5 is a small portion of the curve of FIG. 4, with the time axis enlarged and the voltage axis greatly enlarged. The straight line is tangential to the curve at the point in the curve where the rate of charge drops to 0.5 mV per minute. This is the point where the charge is terminated or converted to maintenance current.

The voltage of the power supply is preferably selected so that it is higher than the peak voltage that the cell or battery will reach during the recharge. This is to prevent the charge algorithm from being confused with a voltage limited or constant voltage charge algorithm.

The operation of the present invention may be favorably contrasted with the operation of battery rechargers described in the prior art. Consider a battery charger that applies a taper charge for a fixed time period. Because a battery's charging characteristics depends upon the battery's past history, it is highly unlikely that the fixed time period will cause the battery to receive exactly the desired amount of charge. If the time period is too short, the battery will not receive enough charge and the battery will not in fact be fully charged. If the time period is too long, the battery will receive more than the required amount of charge. The continued charge will not longer increase the energy stored in the battery; instead, it will be wasted as heat or will even damage the battery. A battery recharger that terminates upon the recharging battery reaching a preselected voltage will face the same problems as a recharger that terminates after a selected time. If the preselected voltage is less than the actual voltage that the recharging battery could obtain, the charge time will be too short; if the preselected voltage level is higher than the battery could obtain, the recharger will not terminate charging and excess heat will be generated. Lead-acid battery rechargers that terminate based upon the temperature of the recharging battery are not feasible because they would have to sense temperature levels that are affected by such factors as the ambient air temperature.

A further advantage of the present invention is that the amount of charge applied to a battery is independent of ambient and battery temperature. In prior art systems that terminate the charging current upon the cell reaching a given voltage, the charging current will be terminated too early in a warm environment where the cell has a higher apparent voltage and will be terminated too late in a cool environment where the cell has a lower apparent voltage. The present system avoids both problems by relying on the rate of cell voltage change rather than the value of cell voltage.

The specifications of the components of the present invention will vary depending upon the type of battery to be charged. As an example, consider the present invention designed to charge batteries of a nominal voltage of two volts. The constant voltage source is at 3.05 volts and can supply a maximum current of 1.5 to 4.5 A. The table below also provides illustrative specifications to charge batteries of nominal voltages of 6 volts, 10 volts, 12 and 24 V.

| NOMINAL BATTERY VOLTAGE | 2 V | 6 V | 10 V | 12 V | 24 V |
|---|---|---|---|---|---|
| Number of cells (n) | 1 | 3 | 5 | 6 | 12 |
| Transition voltage | 1.70 V to 2.63 V | 5.10 V to 7.89 V | 8.50 V to 13.15 V | 10.20 V to 15.78 V | 20.40 V to 31.56 V |
| I | $\frac{(3.05 - V_{cell})}{0.3} \pm 2\%$ | $\frac{(3.05 - V_{battery})}{0.9} \pm 2\%$ | $\frac{(3.05 - V_{battery})}{1.5} \pm 2\%$ | $\frac{(3.05 - V_{battery})}{1.8} \pm 2\%$ | $\frac{(3.05 - V_{battery})}{3.6} \pm 2\%$ |
| Termination threshold voltage | 2.35 V ± 0.04 V | 7.05 V ± 0.04 V | 11.75 V ± 0.04 V | 14.10 V ± 0.04 V | 28.20 V ± 0.04 V |

In the table, supply voltages have been selected as being a multiple of the nominal voltages of the batteries to be charged. Selecting a higher voltage ratio would produce a higher charging current and selecting a lower voltage ratio would have the opposite effect. The charging current is also affected by the value of the series resistor. In the illustrative values depicted in the table, a resistor value of 0.3 ohms is chosen. Other resistor impedances are feasible and within the scope of the invention, provided that they are capable of withstanding the power produced at the maximum current.

What is claimed is:

1. A method of recharging a lead acid cell, comprising: applying to the cell through a power supply current, wherein said current declines as a function of increasing cell voltage; and terminating or converting said current to a maintenance charge, wherein said function is a substantially straight line function, and wherein said function is defined as:

$$I = \frac{(V_p - V_c)}{R} \pm x$$

where:

I=second current
$V_p$=fixed voltage of the power supply
$V_c$=cell voltage
R=impedance of a resistor in series with the cell
x=a tolerance.

2. The method of claim 1, wherein x is approximately 2%.

3. The method of claim 1, further comprising periodically determining a rate of voltage change on the cell, and terminating the charge or converting the charge to a maintenance charge when the rate of voltage change decreases to a predetermined rate.

4. The method of claim 3, wherein said predetermined rate of change is less than 1.0 mV per minute.

5. The method of claim 4, wherein said predetermined rate is approximately 0.5 mV per minute.

6. The method of claim 3, wherein said step of periodically determining the rate of voltage change in the cell and terminating the charge or converting to a maintenance charge when the rate of voltage change decreases to a predetermined rate, is performed after cell voltage exceeds a predetermined threshold voltage.

7. The method of claim 1, further comprising applying to the cell a substantially constant current prior to applying said declining current.

8. The method of claim 1, wherein the cell is capable of peak recharge voltage, and the power supply has a voltage greater than said peak.

9. A device for recharging a lead acid cell, comprising:

means for applying to the cell through a power supply a current, said current declining as a function of increasing cell voltage;

means for terminating or converting said current to a maintenance charge;

said function being a substantially straight line function defined by $$I = \frac{(V_p - V_c)}{R} \pm x$$

where:

I=second current
$V_p$=fixed voltage of the power supply
$V_c$=cell voltage
R=impedance of a resistor in series with the cell
x=a tolerance.

* * * * *